UNITED STATES PATENT OFFICE.

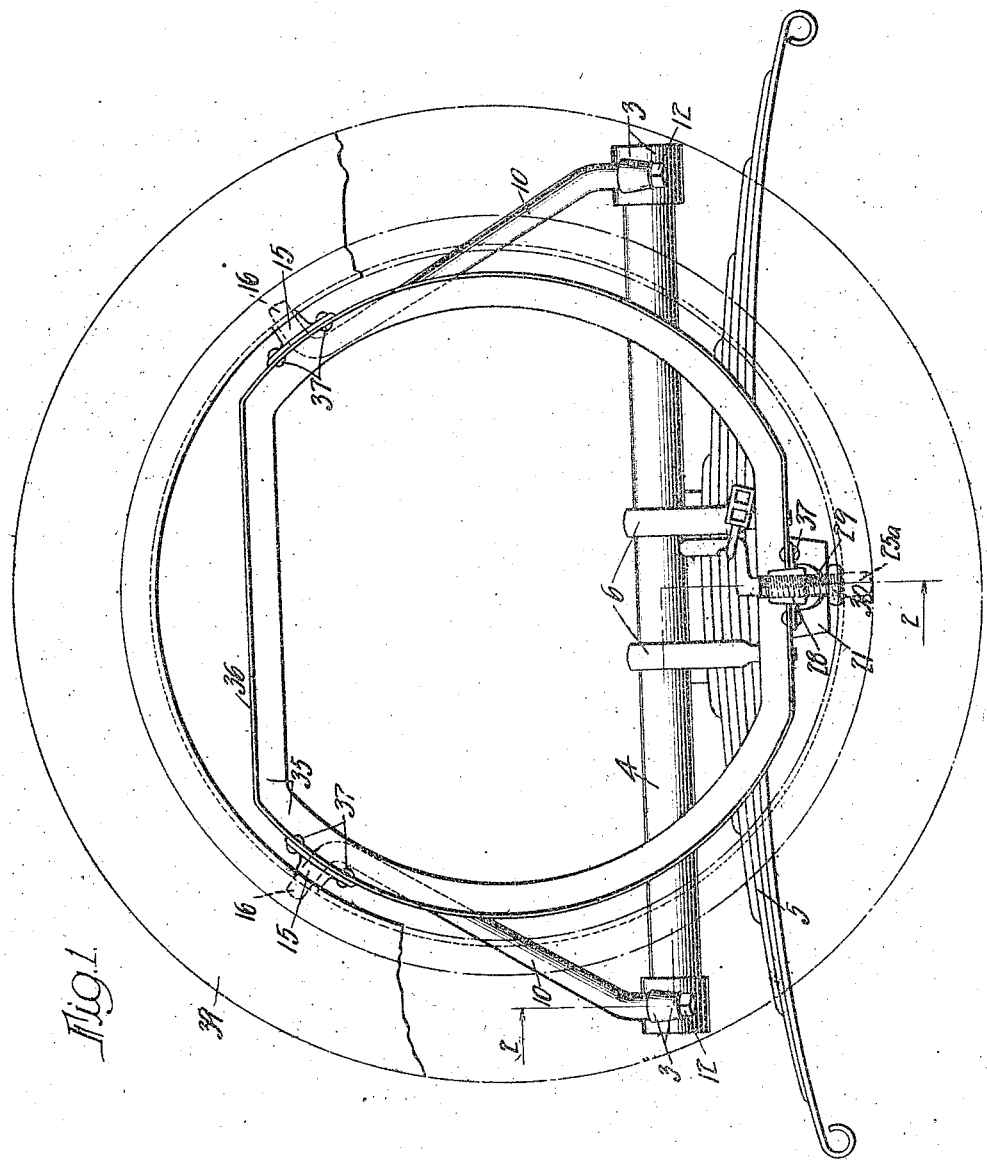

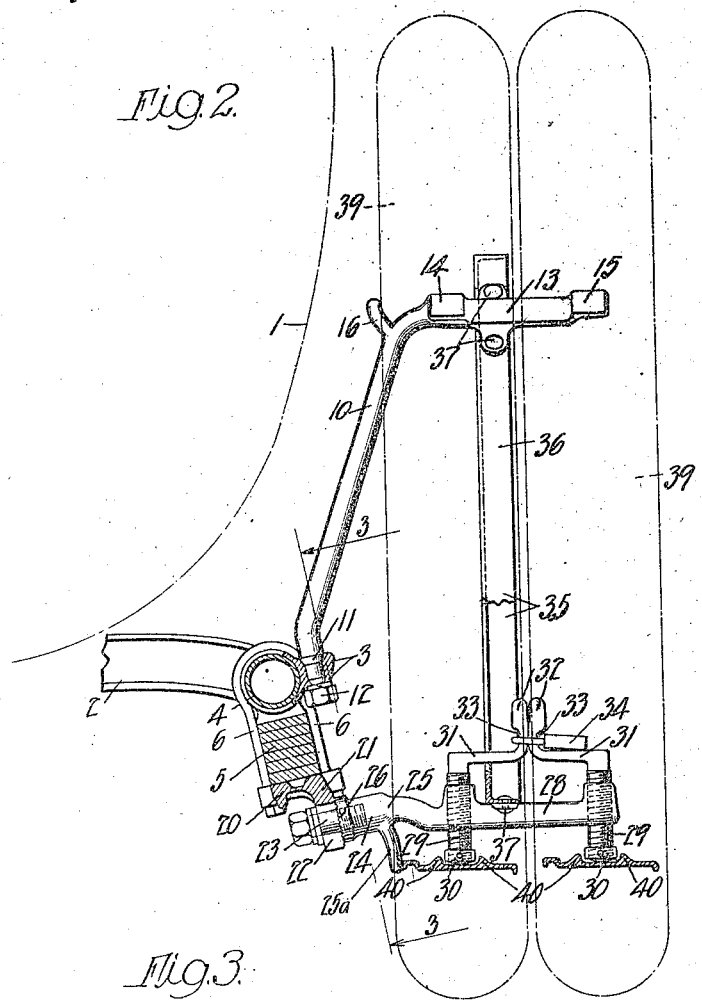
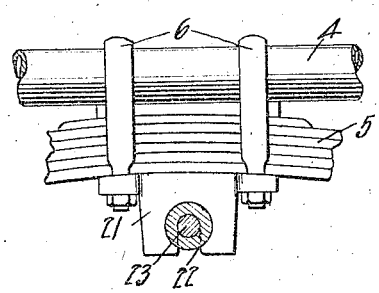

LYLE K. SNELL, OF DETROIT, MICHIGAN.

SUPPORT FOR EXTRA TIRES.

1,147,452.   Specification of Letters Patent.   Patented July 20, 1915.

Application filed February 25, 1915. Serial No. 10,433. REISSUED

*To all whom it may concern:*

Be it known that I, LYLE K. SNELL, a citizen of the United States, and a resident of Detroit, in the county of Wayne and State of Michigan, have invented a new and Improved Support for Extra Tires, of which the following is a specification.

This invention relates to a support for extra tires of motor vehicles; and some of its objects are to provide means whereby the wear on the rubber of the tire caused by direct contact of any of the supporting elements therewith may be avoided; to provide means whereby the tire may be conveniently placed in or removed from position, and whereby it may be securely held while in position; and to improve the construction of tire supports generally.

This invention consists in a support having a plurality of contacts arranged to engage with the rim that carries the tire, one or more of the contacts being adjustable, preferably by threaded means, whereby the rim and tire may be conveniently and rigidly secured in position.

The invention also consists in the various details of construction shown, described and particularly pointed out in the claims.

In the drawings, Figure 1 is a rear elevation of an embodiment of my invention wherein two tires are carried by the same support, the tire nearest the observer being partly broken away. Fig. 2 is a section on the broken line 2—2 of Fig. 1. Fig. 3 is a fragmentary section on the line 3—3 of Fig. 2.

Similar reference characters refer to like parts throughout the several views.

In the embodiment shown, the dashed line 1 indicates the outline of the rear of a well known type of vehicle body; and 2 designates the side bars of the chassis, the rear ends of the latter of which may be shaped to receive the ends of a cross-piece 4, preferably tubular, by which the side bars are joined. This cross-piece bears the weight of the rear end of the chassis, and rests at its mid-portion upon the cross spring 5, being secured thereto by clamping bolts 6 that may be U-shaped. The ends of the spring 5 may be supported in any desired manner.

Extending upwardly, rearwardly and inwardly (in respect to a vertical plane through the longitudinal axis of the vehicle) from the ends of the cross-bar 4 are the members 10 (preferably rods) the threaded lower ends of which may be shouldered at 11 and passed through alined perforations in the ends 3 of the side bars 2, being secured therein by the nuts 12. The upper end of each of the rods is extended rearwardly in a substantially horizontal direction, as indicated at 13, and may be provided with the outwardly turned contact portions 14 and 15, the distance between which is preferably somewhat greater than the thickness of one of the tires which is to be supported: the rods are also preferably provided with limit stops 16, the function of which is to prevent a tire from being thrust too far forwardly on the support.

The ends of the clamping bolts 6 may pass through openings in a block 20 in engagement with the lower face of the spring 5, the block preferably including a downwardly turned flange 21 having a slot 22 therein. Passing through the slot is a bolt 23, the rear end of which may be threaded into the base 24 of a rearwardly extending supporting member 25; the contacting surfaces of the supporting member and flange 21 may be roughened at 26 to afford an effective gripping engagement. It will be observed that the slot allows the member 25 to be adjusted vertically in respect to the block. The member 25 is extended substantially horizontally at 28 and is perforated and threaded at points in its length, corresponding to the distance between the contact portions 14 and 15, to receive the hand screws 29, having the contact points 30 formed integrally therewith or otherwise connected thereto. Each of the latter preferably comprises a laterally extending lever arm 31, the outer end of which is shaped to form a hand grip 32 and a restricted neck 33; and it is desirable to make the lengths of the lever arms such that the hand grips may be brought into close proximity to each other and locked by a padlock 34. The member 24—25 may be provided with a limit stop 25$^a$, similar to the stops 16 heretofore described.

It is obvious that, were the contact surfaces 14 and 15 and the member 25 supported in fixed relation to each other, a tire and rim of a wheel might be slipped thereover, after which the corresponding hand screw 29 could be extended to engage the inner surface of the rim and clamp the latter and the tire rigidly in position. The brace member 35 is therefore provided. As shown, this member is substantially ring-shaped, being formed of an angle iron having a flange 36 to which the three supporting members are secured by the rivets 37; while the bracing member may be other than ring-shaped (for example, triangular or T-shaped), the form shown is desirable because of appearance, and also because its unobstructed center allows ready access to a tool-box, fuel tank or other element (not shown) often carried on the rear of the chassis. Also, while it is desirable to arrange the brace in a plane between the two sets of contact points, in order to secure most efficient bracing, it may be placed elsewhere.

In use the tires 39 are placed over the contact points 14 or 15, the rims resting thereon, after which the hand screws are extended to engage and clamp the rim. Various forms of rims may be used; that shown includes the ribs 40 (Fig. 2) that serve to form an annular groove upon its inner face in which the contact points and the ends of the hand screws are received; the groove might, however, be formed in the contact point itself, in which case the rim might have a single rib corresponding to the said groove. It will be seen that when the rim and tire are supported in this manner, the wear on the rubber of the binding straps and other contacting supporting elements commonly used is entirely avoided, and that both of the tires are supported on a rigid member having no joints, whereby a support is formed in which the liability of failure and the expense of construction is small.

It will be noted that all variations in size and shape of the rim are compensated for by the three-point support when a screw is provided for adjusting one of the contacts. While it is desirable to place the support at the rear of the vehicle, it is clear that it may be located elsewhere, and that it may be carried by portions of the vehicle other than the springs. It is also clear that many changes may be made in the specific details of construction without departing from the spirit of my invention. I do not, therefore, wish to be limited otherwise than as indicated by the subjoined claims.

I claim:—

1. In combination with the side bars of the chassis of a motor vehicle and a cross bar connecting the rear ends thereof, tire supporting members, one of which extends rearwardly from substantially the midpoint of the cross bar and others of which extend rearwardly from the vicinity of the ends of the cross bar, the rear end of one of the supporting members being located at a different level from that at which the rear ends of others are located, each of the rear ends of the supporting members being provided with outwardly extending contact points, said contact points being spaced angularly about the interior of the rim of a tire carried thereon, and threaded means for adjusting one of the contact points radially in respect to the axis of the tire, the whole arrangement being such that the rim and tire may be conveniently secured to or detached from the members by which they are supported.

2. In combination with the side bars of the chassis of a motor vehicle and a cross bar connecting the rear ends thereof, tire supporting members, one of which extends rearwardly from substantially the midpoint of the cross bar and others of which extend rearwardly from the vicinity of the ends of the cross bar, the rear end of the first mentioned supporting member being located at a lower level than the rear ends of the other supporting members, each of the rear ends of the supporting members being provided with an outwardly extending contact point, said contact points being spaced angularly about the interior of the rim of a tire carried thereon, means for adjusting one of the tire supporting members radially in respect to the axis of the tire, and threaded means for adjusting one of the contact points radially in respect to the axis of the tire, the whole arrangement being such that the rim and tire may be supported and wear of the supporting members on the tire may be avoided.

3. In combination with the side bars of the chassis of a motor vehicle and a cross bar connecting the rear ends thereof, tire supporting members, one of which extends rearwardly from substantially the midpoint of the cross bar and others of which extend rearwardly from the vicinity of the ends of the cross bar, the rear end of one of the supporting members being located at a different level from that at which the rear ends of others are located, each of the rear ends of the supporting members being provided with an outwardly extending contact point, said contact points being spaced angularly about the interior of the rim of a tire carried thereon, threaded means for adjusting one of the contact points radially in respect to the axis of the tire, means for bracing the outer ends of the supporting members and holding them in fixed angular relation to each other, the whole arrangement being such that the rim and tire may be conveniently secured to or detached from the tire supporting members.

4. In combination with the side bars of the chassis of a motor vehicle, a cross bar connecting the rear ends thereof, and a cross-spring upon which the cross bar rests at substantially its mid-point, a block in engagement with the lower side of the spring at substantially its mid-point, means for clamping the block, the spring and the cross bar securely together, a tire support member extending rearwardly from the block, tire supporting members extending rearwardly from the vicinity of the ends of the cross bar and having their rear ends located at a higher level than that of the rear end of the first mentioned supporting member, each of the rear ends of the supporting members being provided with an outwardly extending contact point, said contact points being spaced angularly about the interior of the rim of a tire carried thereon, and threaded means for adjusting one of the contact points radially in respect to the axis of the tire, the whole arrangement being such that the rim and tire may be supported and wear of the supporting members on the tire may be avoided.

5. In combination with the side bars of the chassis of a motor vehicle, a cross bar connecting the rear ends thereof, and a cross-spring upon which the cross bar rests at substantially its mid-point, a block in engagement with the lower side of the spring at substantially its mid-point, means for clamping the block, the spring and the cross bar securely together, a tire supporting member extending rearwardly from the block, means for adjusting the tire supporting member vertically on the block, tire supporting members extending rearwardly from the vicinity of the ends of the cross bar and having their rear ends located at a higher level than that of the rear end of the first mentioned supporting member, each of the rear ends of the supporting members being provided with an outwardly extending contact point, said contact points being spaced angularly about the interior of the rim of a tire carried thereon, and means for adjusting one of the contact points radially in respect to the axis of the tire, the whole arrangement being such that the rim and tire may be conveniently secured to or detached from the tire supporting members.

6. In combination with the side bars of the chassis of a motor vehicle and a cross bar connecting the rear ends thereof, tire supporting members, one of which extends rearwardly from substantially the mid-point of the cross bar and others of which extend rearwardly from the vicinity of the ends of the cross bar, the rear end of one of the supporting members being located at a different level from that at which the rear ends of others are located, each of the rear ends of the supporting members being provided with a plurality of outwardly extending contact points arranged in sets, said rear ends serving as rigid connections between the corresponding contact points carried thereby, said contact points being spaced angularly about the interior of the rims of tires carried thereon, means for adjusting one of the contact points of each set radially in respect to the axis of the corresponding tire, and means for locking the adjusting means in adjusted position, the whole arrangement being such that a tire may be supported on each set of contact points and wearing of the supporting elements on the rubber of the tires is avoided.

7. In combination with the side bars of the chassis of a motor vehicle and a cross bar connecting the rear ends thereof, tire supporting members, one of which extends rearwardly from substantially the mid-point of the cross bar and others of which extend rearwardly from the vicinity of the ends of the cross bar, the rear end of one of the supporting members being located at a different level from that at which the rear ends of others are located, each of the rear ends of the supporting members being provided with a plurality of outwardly extending contact points arranged in sets, said rear ends serving as rigid connections between the corresponding contact points carried thereby, said contact points being spaced angularly about the interior of the rims of tires carried thereon, means for bracing the rear portion of said supporting members and holding them in fixed relation to each other, said bracing means being located in a plane between the planes in which the members of the different sets of contact points are located, means for adjusting one of the contact points of each set radially in respect to the axis of the corresponding tire, and means for locking the adjusting means in adjusted position, the whole arrangement being such that a tire may be supported on each set of contact points and wearing of the supporting elements on the rubber of the tires is avoided.

8. In combination with a motor vehicle, a tire supporting means carried thereby, said tire supporting means including a plurality of sets of elements arranged to contact with the interior of the rims of tires supported thereon at points angularly removed from one another about the axis of the tires, separate means for adjusting one element of each set toward and from the interior of the corresponding tire, and means for locking the adjusting means together whereby they are held in adjusted position.

9. In combination with a motor vehicle, a tire supporting means carried thereby, said tire supporting means including a plurality of sets of elements arranged to contact with the interior of the rims of tires supported thereon at points angularly removed from one another about the axis of the tires, separate screw-threaded means for adjusting one element of each set toward and from the interior of the corresponding tire, each of the screw-threaded means including an operating handle, and means for locking the handles together whereby the adjusting means may be retained in a desired position.

In testimony whereof I sign this specification in the presence of two subscribing witnesses.

LYLE K. SNELL.

Witnesses:
L. M. SPENCER,
HUGO W. KREINBRING.